No. 672,659. Patented Apr. 23, 1901.
W. S. WOOD & S. DOUGLASS.
ROLLER BEARING AND BOXING.
(Application filed July 31, 1900.)
(No Model.) 2 Sheets—Sheet 2.
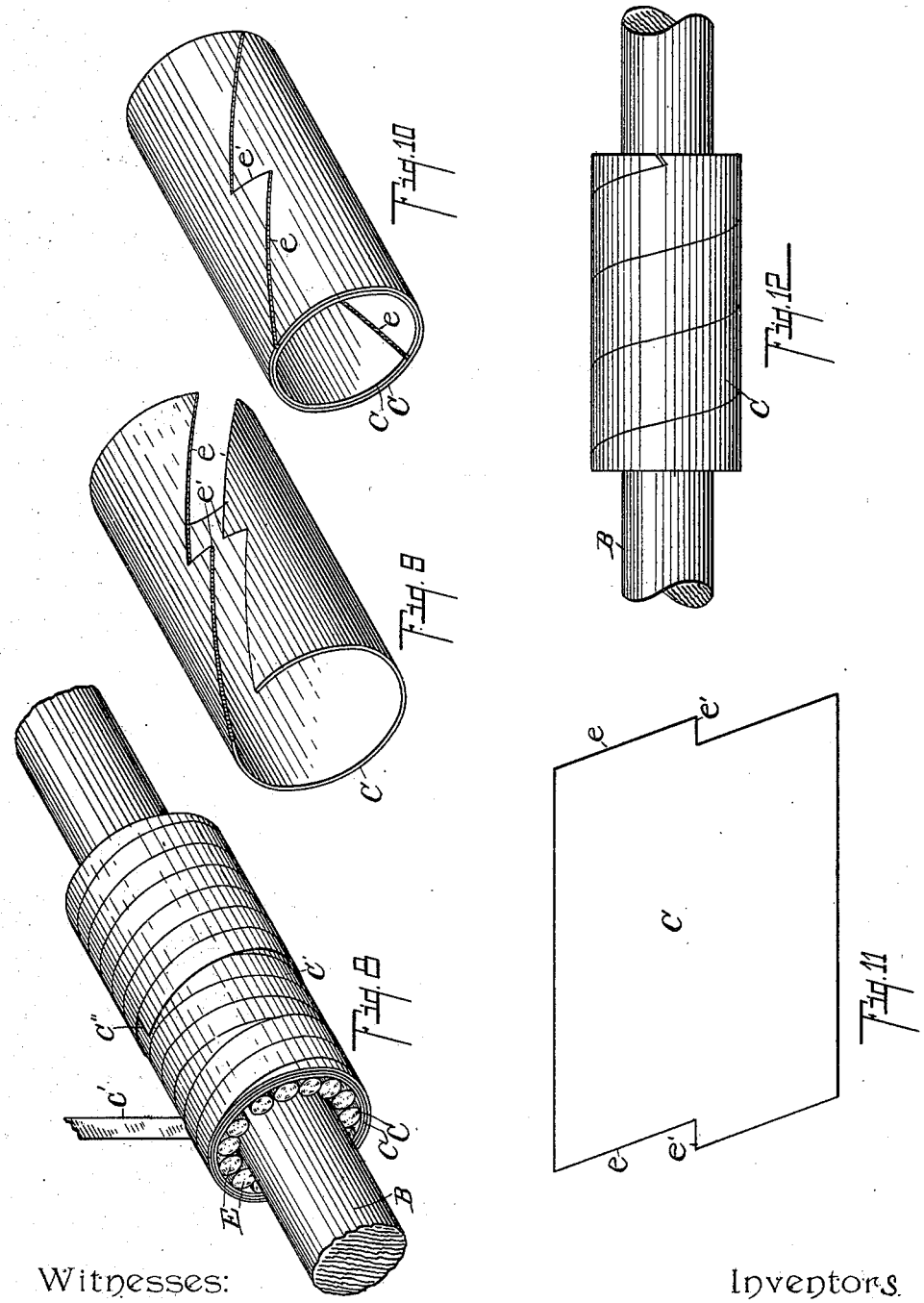
Witnesses:
A. E. Houghton
Otis A. Earl
Inventors
Samuel Douglass & Walter S. Wood
By Fred L. Chappell
Att'y.

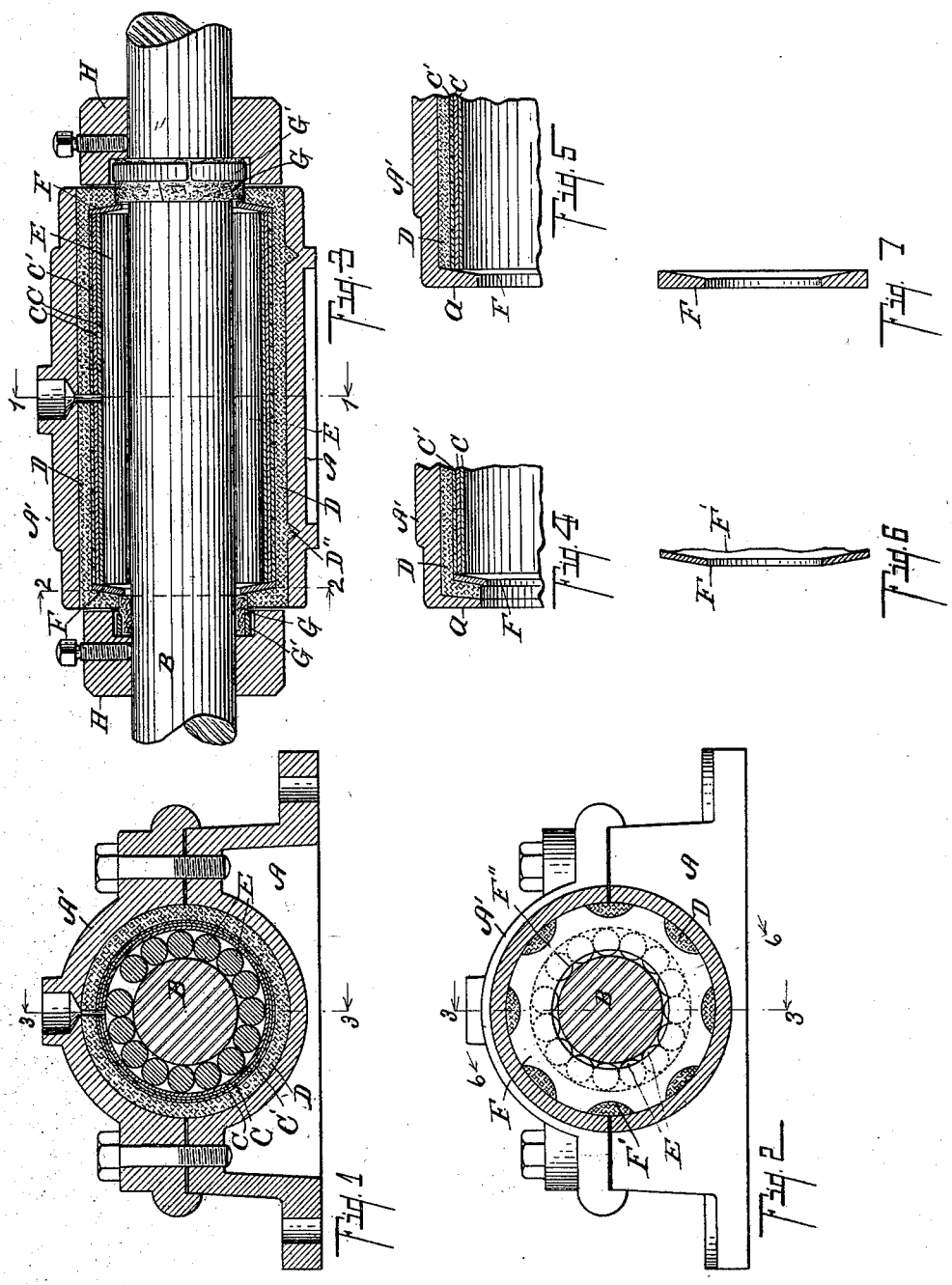

UNITED STATES PATENT OFFICE.

WALTER S. WOOD, OF KALAMAZOO, AND SAMUEL DOUGLASS, OF SCHOOL-CRAFT, MICHIGAN.

ROLLER BEARING AND BOXING.

SPECIFICATION forming part of Letters Patent No. 672,659, dated April 23, 1901.

Application filed July 31, 1900. Serial No. 25,377. (No model.)

*To all whom it may concern:*

Be it known that we, WALTER S. WOOD, residing in the city of Kalamazoo, and SAMUEL DOUGLASS, residing in the village of Schoolcraft, in the county of Kalamazoo and State of Michigan, citizens of the United States, have invented certain new and useful Improvements in Roller Bearings and Boxings, of which the following is a specification.

This invention relates to improvements in roller-bearings.

The objects of this invention are, first, to provide a roller-bearing which may be easily applied to shafting which is already in position and use without the necessity of having to take it down or uncouple it in any manner; second, to provide a roller-bearing which can be cheaply manufactured and which is effective in operation and durable in construction; third, to provide a roller-bearing in which the bearing-surface on the ends of the rollers is reduced to a minimum, so that the rollers will run in a vertical or inclined position as well as in the horizontal position and be prevented from endwise movement; fourth, to provide in a roller-bearing cheap, effective, and easily-applied means of excluding dust and dirt from the revolving parts and also to assist in retaining the lubricant used; fifth, to provide in a roller-bearing an improved bushing or casing to retain the rollers which may be used with ordinary split or solid types of boxes, as desired, and, sixth, to provide an improved bushing or casing.

Further objects will definitely appear in the detailed description to follow.

We attain these object of our invention by the devices and means described in this specification.

The invention is clearly defined and pointed out in the claims.

Structures embodying our invention are clearly illustrated in the accompanying drawings, forming a part of this specification, in which—

Figure 1 is a transverse sectional elevation through a journal-box embodying our invention, taken on line 1 1 of Fig. 3. Fig. 2 is a transverse sectional elevation taken on line 2 2 of Fig. 3. Fig. 3 is a longitudinal sectional elevation taken on line 3 3 of Figs. 1 and 2, certain of the parts being shown in full lines. Figs. 4 and 5 are detail longitudinal sectional views showing slight modifications of the boxing more fully described hereinafter. Fig. 6 is a detail sectional view of one of the end plates F, taken on line 6 6 of Fig. 2. Fig. 7 is a similar view showing a modified form of the same part. Fig. 8 is a detail perspective view of the shafting-rollers and casing for same assembled in position, showing details of construction. Fig. 9 is a detail perspective view of a casing substantially as it is formed before placing about the shaft and rollers. Fig. 10 is a detail perspective view of a double casing, being substantially duplicates of the casing appearing in Fig. 8 with the joints overlapping, but with the winding omitted. Fig. 11 is a detail view of the casings as they are cut from sheet metal. Fig. 12 is a detail view of a modified form of casing made of a long narrow strip as it would appear about the rollers and shaft, but with the winding omitted.

In the drawings the sectional views are taken looking in the direction of the little arrows at the ends of the section-lines, and similar letters of reference refer to similar parts throughout the several views.

Referring to the lettered parts of the drawings, A is a pillow-block or base of an ordinary journal-box, and A' is the cap therefor, which is secured to the base A by bolts or screws in the ordinary way.

B is the journal or shafting.

E represents rollers arranged around the shaft within the boxing. These rollers are of such size and number that there is a slight unoccupied space on the circumference of the shaft.

C C are double casings outside of the rollers E. These casings are cut, preferably from sheet-steel, substantially in the shape shown in Fig. 11 and of proper size. The inner casing is preferably made of spring-steel. The outer casing is preferably made of annealed steel, brass, copper, or other suitable material. For convenience in assembling these casings are preferably passed between bending-rollers and shaped substantially as shown in Fig. 9. The meeting edges e e of these casings should preferably be a little separated when in position about the rollers, as shown in Fig. 10, thus insuring a close fit about the rollers. The meeting edges of these casings should preferably be diagonal to the line of the shafting and rollers, so as to form no obstruction to the rollers in passing the joint. For convenience in adjusting the casings in position about the rollers an offset or notch e' e' is made in the meeting edges e e, which acts to lock the edges and hold them in proper relation to each other and prevent any slipping which otherwise might occur. This is best; but we are aware that other means of locking may be employed. In assembling these casings they are sprung open and placed around the shaft and adjusted about the rollers so that the joints of the two casings shall come substantially at opposite sides of the shaft, as shown in Fig. 10, when they are very securely wound, preferably with annealed-metal ribbon C', usually brass, although wire or other suitable material may be used. The most satisfactory results in winding are obtained by commencing in the center of the casing and winding out to each end and back again to the center, when the ends C'' may be securely fastened with a little solder, all of which is particularly illustrated in Fig. 8. It will be apparent that this manner of winding the casing about the rollers insures a much closer fit of the casing to the rollers and shaft than is possible to obtain by boring out the casing from a solid tube and then forcing the rollers into place endwise, as is usually done, when the last roller or two will, if a very tight fit is obtained, make a slight groove in the shaft or casing, or both, which would be very detrimental to the smooth working of the parts.

While we prefer a double casing in the construction of our improved roller-bearing, we are aware that for small bearings and light work a single casing is perfectly practical and effective, while for very large bearings carrying heavy loads two or more casings or as many as desired may be used, or two casings may be wound on the rollers and then another casing placed outside the winding and that in turn wound on, and so on.

In Fig. 12 we show a modification of the casing in which the sheet metal is cut of the proper shape to admit of being wound about the roller spirally, as shown. It is apparent that these casings may be wound in the same manner as the others.

We have found that in actual practice with roller-bearings there is a tendency for more or less of the rollers to get out of proper alinement with the shaft and casing, which is due principally to slight inaccuracies in the rollers, shaft, or casing, which seems difficult to overcome in manufacture, thereby producing undue friction of the parts. The closeness with which we are able to fit the casing to the rollers obviates these difficulties to a great extent and maintains the rollers practically in true alinement. When the rollers are out of true alinement with the shaft, there is a tendency for them to work endwise or creep and crowd hard against the end bearings or collars which are usually used to retain the rollers in place longitudinally. To obviate this difficulty and reduce the friction of the rollers on the end bearings to a minimum, so that they will work in a vertical or inclined position as well as in a horizontal position, we employ an improved end-bearing annular ring F at each of the rollers E. The rollers are cut perfectly square at their ends. These end-bearing rings F are slightly beveled on their face next to the end of the rollers, so that the only point of contact between the end of the roller and the ring is at the periphery of the roll, at which point there is practically no movement or rubbing of the rollers on the ring, and consequently no friction. Thus it will be seen that any undue friction caused by the tendency of the rollers to work endwise against the bearing-rings is practically obviated and the rollers will run as free when used in a vertical as in a horizontal position. These end-bearing rings are preferably punched or stamped from sheet-steel having a spring temper and of substantially the shape shown in Figs. 2 and 6.

For convenience in placing the rings on shafting which is already in position, or when it is not convenient to pass them over the end of the shaft, they may be slit, as at F'' in Fig. 2, when they can be easily sprung open and placed on the shaft at any desired point.

After having adjusted the casings about the rollers and the annular end-bearing rings F on the shaft in proper position in the boxing A A' we fill the space between the inside of the boxing and the outside of the casing and annular rings F with Babbitt metal D or other suitable metal, substantially as we would babbitt an ordinary journal-box. This forms a firm covering around the casing and locates the bearing in the pillow-block or boxing in true alinement with the journal. Other substances which will readily solidify and become sufficiently hard from a plastic state and susceptible of being cast in the mold the same as Babbitt or similar metals may in many cases be used in place of Babbitt metal. This insures a perfect alinement of the shaft and bearings and a solid and secure support in the boxing. The annular rings F have portions cut out of their peripheries, as at F', for the purpose of allowing the babbitt to flow through to the outside of the rings, so as to hold them in position and to form the end of the bushing or boxing. After the winding of the casing is completed it may be entirely or partially coated with solder by means of a soldering-iron or other means, as also may the outside of the annular rings F. Then the hot babbitt will adhere or amalgamate with the solder and form practically a solid bushing, which may be removed from the boxing and replaced with perfect accuracy. This correct position is insured by means of the little projecting points D" on the babbitt D, fitting into corresponding depressions in the boxing A.

Where greater strength is required outside the end-bearing rings F than is afforded by the Babbitt metal, annular flanges $a$ may be cast integral with the boxing A A', as shown in Fig. 4. In Fig. 5 we show a modified form of construction in which the annular flange $a'$ is made also to serve the purpose of the annular bearing-ring F.

To protect the rollers from dust and other substances which would tend to obstruct their free movement and also to assist in retaining the oil used in lubricating the rollers, we employ a ring of felt or other suitable substance G, placed around the shaft at each end of the rollers, just outside the end-bearing rings F, which is held in position by means of spring-rings G', all of which is shown in Fig. 3, the ring of felt and the spring at the left-hand end in the drawings being shown in section. Set-collars H H on the shaft at each end of its boxing are for the purpose of preventing longitudinal movement of the shaft. They are chambered out to fit over the rings G and G', as shown in Fig. 3.

It is obvious that with the end-bearing rings F at each end of the casing there is formed a practical and effective oil-reservoir in the bottom thereof which every roller must pass through every time it passes around the shaft, thus insuring complete lubrication. The oil is supplied through the oil-cup in the top of the boxing, as shown.

We desire to state that while we have shown and described our invention in its preferred form we are aware that it may be greatly varied without departing from the spirit of our invention. The pillow-block or boxing may be made of wood in many cases and will be found to answer every purpose and be much cheaper than a cast box. The casings C C may be made of drawn-steel tubing and cut open on one side in any suitable manner, so as to allow the tubing to be wound down tight to the rollers. The features outside of the casing could be made use of with any other casing, as a casing could be made of a piece of drawn tubing when the close fit of the casing to the rollers was not material, and this casing could be placed on the shafting over the end.

We desire also to state that while we have shown our device as applied to bearings for shaftings it may be applied to hubs of loose pulleys, wheels, and axles for vehicles, &c.

Having thus described our invention, what we claim as new, and desire to secure by Letters Patent, is—

1. In a roller-bearing, the combination of a suitable shaft or journal; a journal-boxing made up of a bottom section A and top section A' suitably fitted together; rollers arranged around said journal; a shell of suitable sheet metal embracing said rollers and retaining them closely upon the said journal; a ribbon of metal embracing said shell and retaining it securely in position in close contact with the rollers on the journal; end collars to each end of said shell embracing the said journal; Babbitt metal between the said shell and end collars and the outer casing; rings of felt or similar material to each end of the said boxing retained by a spring-ring; and set-collars on said shaft to each end of the boxing, all coacting substantially as described, for the purpose specified.

2. In a roller-bearing the combination of a suitable shaft or journal; a journal-boxing made up of sections; rollers arranged around said journal; a shell of suitable sheet metal embracing said rollers and retaining them closely upon the said journal; a ribbon of metal embracing said shell and retaining it securely in position in close contact with the rollers on the journal; end collars to each end of said shell embracing the said journal; Babbitt metal between the said shell and end collars and the outer casing; rings of felt or similar material to each end of the said boxing, all coacting for the purpose specified.

3. In a roller-bearing the combination of a suitable shaft or journal; a journal-boxing made up of sections; rollers arranged around said journal; a shell of suitable sheet metal embracing said rollers and retaining them closely upon the said journal; a ribbon of metal embracing said shell and retaining it securely in position in close contact with the rollers on the journal; end collars to each end of said shell embracing said journal; Babbitt metal between the said shell and end collars and the outer casing, all coacting for the purpose specified.

4. In a roller-bearing, the combination of a suitable shaft or journal; a journal-boxing made up of sections; rollers arranged around said journal; a shell of suitable sheet metal embracing said rollers and retaining them closely upon the said journal; a ribbon of metal embracing said shell and retaining it securely in position in close contact with the rollers on the journal; Babbitt metal between the said shell and the outer casing; all coacting, for the purpose described.

5. In a roller-bearing, the combination of a suitable shaft or journal; a journal-boxing made up of sections; rollers arranged around said journal; a shell of suitable sheet metal embracing said rollers and retaining them closely upon the said journal; Babbitt metal between the said shell and the outer casing, all coacting for the purpose specified.

6. In a roller-bearing the combination of a suitable shaft or journal; a journal-boxing made up of a bottom section A and a top section A' suitably fitted together; rollers arranged around said journal; a double shell of suitable sheet metal, the edges of the parts of which shell meet on diagonal lines and break joints with each other; a ribbon of metal embracing said shell and retaining it securely in position in close contact with the rollers on the journal; end collars to each end of said shell embracing the said journal; Babbitt metal between the said shell and end collars and the outer casing; rings of felt or similar material to each end of said boxing retained by a spring-ring; and set-collars on said shaft to each end of the boxing, all coacting substantially as described for the purpose specified.

7. In a roller-bearing the combination of a suitable shaft or journal; a journal-boxing made up of sections; rollers arranged around said journal; a double shell of suitable sheet metal, the edges of the parts of which shell meet on diagonal lines and break joints with each other; a ribbon of metal embracing said shell and retaining it securely in position in close contact with the rollers on the journal; end collars to each end of said shell embracing the said journal; Babbitt metal between the said shell and end collars and the outer casing; rings of felt or similar material to each end of said boxing, all coacting for the purpose specified.

8. In a roller-bearing the combination of a suitable shaft or journal; a journal-boxing made up of sections; rollers arranged around said journal; a double shell of suitable sheet metal, the edges of the parts of which shell meet on diagonal lines, and break joints with each other; a ribbon of metal embracing said shell and retaining it securely in position in close contact with the rollers on the journal; end collars to each end of said shell embracing the said journal; Babbitt metal between the said shell and end collars and the outer casing, all coacting for the purpose specified.

9. In a roller-bearing, the combination of a suitable shaft or journal; a journal-boxing made up of sections; rollers arranged around said journal; a double shell of suitable sheet metal, the edges of the parts of which shell meet on diagonal lines and break joints with each other; a ribbon of metal embracing said shell and retaining it securely in position in close contact with the rollers on the journal; Babbitt metal between the said shell and the outer casing, all coacting for the purpose specified.

10. In a roller-bearing, the combination of a suitable shaft or journal; a journal-boxing made up of sections; rollers arranged around said journal; a double shell of suitable sheet metal, the edges of the parts of which shell meet on diagonal lines and break joints with each other; Babbitt metal between the said shell and the outer casing, all coacting for the purpose specified.

11. In a roller-bearing, the combination of a shaft or journal; a divided boxing therefor; rollers arranged around said journal; a shell made up of a scroll of sheet metal, the edges of which are notched and meet upon a diagonal line; end plates to each end of said shell; and Babbitt or similar metal between the shell and outer casing, coacting as specified.

12. In a roller-bearing, the combination of a shaft or journal; a divided boxing therefor; rollers arranged around said journal; a shell made up of a scroll of sheet metal, the edges of which are notched and meet upon a diagonal line; and Babbitt or similar metal between the shell and outer casing, coacting for the purpose specified.

13. In a roller-bearing, the combination of a shaft or journal; a divided boxing therefor; rollers arranged around said journal; a shell made up of a scroll of sheet metal, the edges of which are notched and meet upon a diagonal line; and a suitable binding around the said shell adapted to rest within the split boxing, for the purpose specified.

14. In a roller-bearing, the combination of a shaft or journal; a divided boxing therefor; rollers arranged around said journal; a shell made up of a scroll of sheet metal, the edges of which are notched and meet upon a diagonal line; and a strand or ribbon of metal around said shell to retain it securely in position, for the purpose specified.

15. In a roller-bearing, the combination of a shaft or journal; rollers arranged around the same; a shell to retain said rollers made up of a scroll of sheet metal, the edges of which meet on a diagonal line; and a retaining device consisting of a ribbon or strand of metal wound upon and embracing the same, for the purpose specified.

16. In a roller-bearing, the combination of a shaft or journal; rollers arranged around the same; a shell to retain said rollers made up of a scroll of sheet metal; and a retaining device consisting of a ribbon or strand of metal wound upon and embracing the same, for the purpose specified.

17. In a roller-bearing, the combination of a shaft or journal; rollers arranged around the same; a shell to retain said rollers made up of a scroll of sheet metal; a flat ring of sheet metal opened at one side arranged at each end of said shell; a strand or ribbon of metal to bind said shell; and a cast of metal around the whole for the purpose specified.

18. In a roller-bearing the combination of a shaft or journal; rollers arranged around the same; a shell to retain said rollers made up of a scroll of sheet metal; a ring of sheet metal opened at one side, arranged at each end of said shell; and a cast of metal around the whole for the purpose specified.

19. In a roller-bearing, the combination of a shaft or journal; a boxing therefor; rollers around said journal; a shell or casing of sheet metal open at one side, around said rollers; a winding about said casing to retain it in contact with said rollers; a cast material between said boxing and casing, for the purpose specified.

20. In a roller-bearing, the combination of a shaft or journal; a boxing therefor; rollers arranged around said journal; a shell or casing outside of said rollers; end-bearing rings to each end of said casing; a cast material between the casing, the end-bearing rings and the outer boxing, for the purpose specified.

21. In a roller-bearing, the combination of a shaft or journal; rollers arranged around said journal; a shell or casing around said rollers; a winding around said shell; end-bearing rings to each end of said casing; and a cast outside the whole, for the purpose specified.

In witness whereof we have hereunto set our hands and seals in the presence of two witnesses.

WALTER S. WOOD. [L. S.]
SAMUEL DOUGLASS. [L. S.]

Witnesses:
A. E. HOUGHTON,
OTIS A. EARL.